United States Patent [19]

Misra et al.

[11] Patent Number: 5,850,421
[45] Date of Patent: Dec. 15, 1998

[54] METHOD AND APPARATUS FOR ESTIMATING CLOCK SLEW AND CARRIER TRANSLATION

[75] Inventors: Raj M. Misra, Sunrise; Vedavalli G. Krishnan, Miami Lakes, both of Fla.

[73] Assignee: Racal-Datacom, Inc., Sunrise, Fla.

[21] Appl. No.: 636,812

[22] Filed: Apr. 23, 1996

[51] Int. Cl.$^6$ .............................. H04L 7/00; H04B 1/38
[52] U.S. Cl. ............................ 375/354; 375/222
[58] Field of Search ...................... 375/354, 222, 375/224, 225, 226, 358; 371/1; 370/503, 516

[56] References Cited

U.S. PATENT DOCUMENTS

| | | | |
|---|---|---|---|
| 4,287,597 | 9/1981 | Paynter et al. | 455/12.1 |
| 5,048,054 | 9/1991 | Eyubogul et al. | 375/222 |
| 5,654,982 | 8/1997 | Goodson et al. | 375/222 |

OTHER PUBLICATIONS

International Telecommunications Union ITU–T V.34 Standard, entitled "A Modem Operating at Data Signalling Rates of up to 28,800 Bit/s etc.", Sep. 1994 edition, 63 pages.

*Primary Examiner*—Stephen Chin
*Assistant Examiner*—Frederick Yu
*Attorney, Agent, or Firm*—Pedro P. Hernandez

[57] ABSTRACT

The present invention helps derive accurate clock and carrier translation presets in the presence of noise and various line shapes. The invention provides an adaptive algorithm that optimizes the calculations of clock slew ($\Delta T_s$) and frequency offset ($\Delta f$) over the specific line conditions encountered at each connection by choosing an optimal subset of the communication device's probing frequencies that minimizes the effect of line losses and noise.

12 Claims, 3 Drawing Sheets

5,850,421

METHOD AND APPARATUS FOR ESTIMATING CLOCK SLEW AND CARRIER TRANSLATION

FIELD OF THE INVENTION

This invention relates in general to the field of communications and more specifically to the field of data communications.

BACKGROUND OF THE INVENTION

Data communication devices such as modems which conform to the International Telecommunication Union's (ITU) V.34 standard, follow a start-up procedure which is divided into four main phases in order to establish a communication link between a local modem and a remote modem. Phase one of the start-up procedure comprises the network interaction phase, phase two the line probing/ranging phase, phase three the equalizer and echo canceller training phase, and phase four comprises the final training phase.

During the line probing phase, channel characteristics such as line shape, line noise, line delays, etc. are determined and are used to determine data mode modulation parameters and presets for the modems. Modem presets which are set during this probing phase include presets for the modem's carrier recovery phase-lock-loop ("PLL"), clock recovery PLL, etc. These parameters and presets in turn have an effect upon the subsequent carrier recovery, echo-cancellation training, equalizer training and clock acquisition performed by the modem.

Two line probing signals, L1 and L2, are used to analyze channel characteristics in V.34 modems. The L1 signal is a periodic signal with a repetition rate of 150+0.01% Hz which consists of a set of tones (cosines) spaced 150 Hz apart at frequencies from 150 Hz to 3750 Hz. Tones at 900 Hz, 1200 Hz, 1800 Hz, and 2400 Hz are omitted leaving 21 probing tones each at a particular frequency. The L1 probing signal is transmitted for 160 ms (24 repetitions) at 6 dB above the nominal power level. The L2 probing signal is the same as the L1 signal but is transmitted for at least 550 ms plus a round-trip delay at the nominal power level. A more complete discussion of the line probing signals can be found in the ITU V.34 standard entitled, "A Modem Operating At Data Signaling Rates Of Up to 28, 800 bit/s for use on the general switched telephone network and on leased point-to-point 2-wire telephone-type circuits", and which is hereby incorporated by reference.

A need thus exists in the art for a method and apparatus which can help provide a good estimate for clock slew and in turn not only help reduce the training time of data communication devices such as modems, but also help in providing more accurate presets (e.g., carrier translation (frequency offset) preset, etc.) which can help minimize the adverse effects of line noise and various other communication line characteristics.

SUMMARY OF THE INVENTION

The present invention helps derive accurate clock and carrier translation presets in the presence of noise and various line shapes using the a signal received by a data communication device, such as a line probing sequence received by a modem. The invention provides an adaptive algorithm that optimizes the calculations of clock slew ($\Delta T_s$) and frequency offset ($\Delta f$) over the specific line conditions encountered at each connection by choosing an optimal subset of the received signal that minimizes the effect of the line loss and noise.

In other embodiments of the invention, once the clock slew estimate is made between the local and remote communication devices, the clock slew information is then used to establish a more accurate estimate for carrier translation.

DETAILED DESCRIPTION OF THE PREFERRED EMBODIMENT

Figure 1:
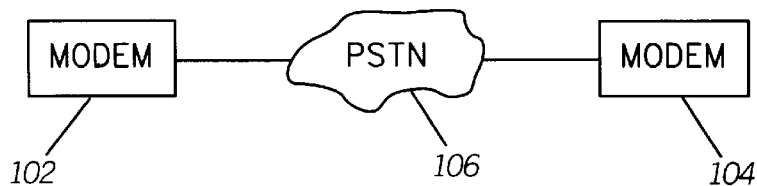
FIG. 1 shows a block diagram of two communication devices in accordance with the invention.

Referring to FIG. 1, a first communication device such as a local modem 102 and a second communication device such as a remote modem 104 are shown connected over the public switched telephone network (PSTN) 106. In order to accomplish fast clock acquisition in accordance with the present invention, the difference ($\Delta T_s$) in the time periods, known as the clock slew, between the clocks of the local data communication device's 102 receiver and the remote data communication device's 104 transmitter is determined.

Although the description of the preferred embodiment which follows will focus on modems, such as modems which conform to the V.34 standard, the present invention is not limited only to modem applications but can be used for other data communication devices which can benefit from having a good estimate for clock slew.

In accordance with the preferred embodiment, once the clock slew between the local modem's 102 receiver and the remote modem's 104 transmitter is determined, the clock slew information is then used to preset the local receiver's clock recovery phase locked loop (PLL). Similarly, the remote transmitter to local receiver carrier translation (i.e., frequency offset, $\Delta f$), after correction for clock slew can be used to preset the carrier recovery PLL, and the bi-directional frequency offset can be used to preset the far-echo canceller's PLL in other aspects of the invention.

Preferably, the quantities $\Delta T_s$ and $\Delta f$, are determined from the change ($\phi$) in the phase ($\Theta$) versus frequency curve of the Discrete Fourier Transform (DFT) of the receive modem's probing sequence samples over successive temporal windows (time frames). The accuracy of the above calculations are significantly affected however, by the signal-to-noise ratio (SNR) at the individual probing frequencies, which in turn depend on the specific line (channel) frequency response and the noise power spectral density encountered at each connection. In the preferred embodiment, the V.34 standard's L2 line probing signal is used to determine the clock slew estimate. Those skilled in the art will realize that alternatively, the L1 line probing signal or both the L1 and L2 signals could be used to make the appropriate clock slew estimate using the method of the present invention.

Figure 2:
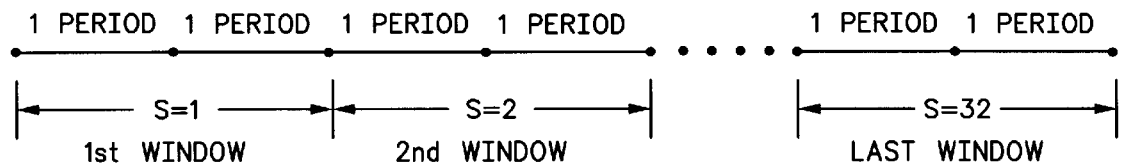
FIG. 2 shows a V.34 probing signal divided into temporal windows in accordance with the invention.
Figure 3:
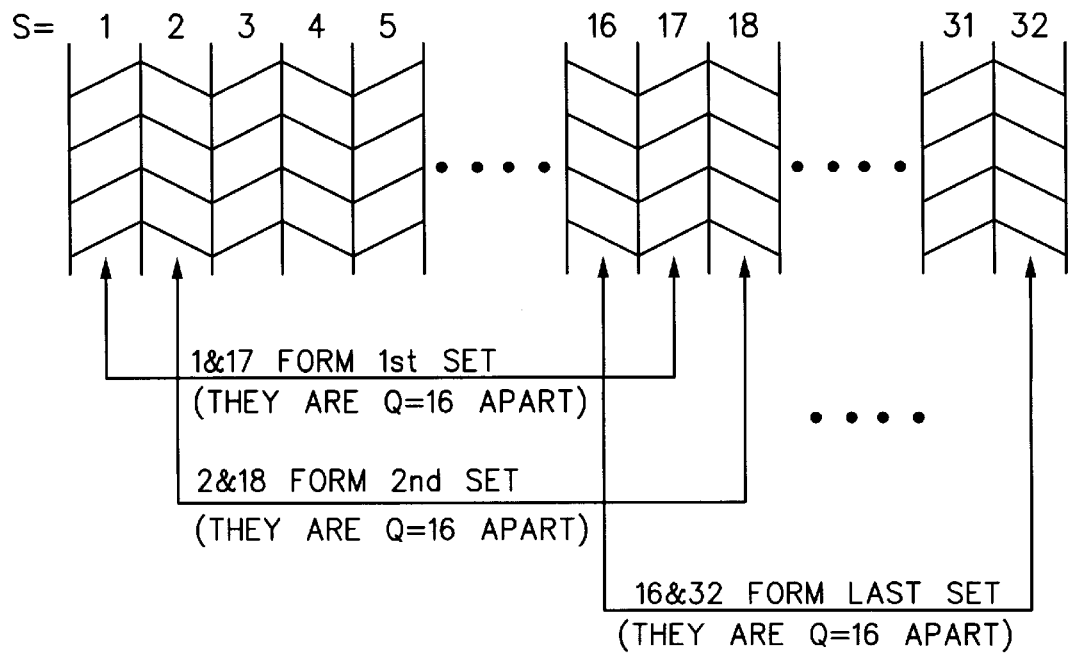
FIG. 3 shows the temporal windows of FIG. 2 organized into sets of two windows per set.

Given that the probing sequence used by modems which operate using the V.34 standard is periodic with frequency $f_0$ Hertz(Hz), the probing sequence in accordance with the preferred embodiment is conceptually divided into temporal windows or time frames of duration $T_{obs}=P/f_0$ seconds, where P is the number of periods in each such temporal window (time period) as shown in FIGS. 2 and 3 and discussed below.

Letting the variables "N", "$f_s$," and "$T_s$," denote the number of samples in each window, the sampling frequency, and the sampling time interval, respectively, and the variable "S" be an integer that indices these windows, then S and S+Q represent two windows separated in time by "Q" windows. The S dependent phase of the DFT value at the $k^{th}$ probing frequency of samples over the $S^{th}$ temporal window can then be readily derived as explained below.

The discrete sequence corresponding to the $1^{th}$ tone, with frequency $f_1$, of the received V.34 probing signal can be represented as:

$$x[n]=r_1*\exp(j\theta_1)*\exp(j2\pi f_1 T_s n), \tag{1}$$

where $r_1$ and $\theta_1$ are the initial real amplitude and phase of the $1^{th}$ tone, respectively. In the presence of clock slew and frequency offset, Equation 1 becomes:

$$x[n]=r_1*\exp(j\theta_1)*\exp(j2\pi[f_1+\Delta f][T_s+\Delta T_s]n). \tag{2}$$

The DFT of x[n] over the $S^{th}$ temporal window of N samples is then:

$$X_S[k] = \sum_{n=(s-1)N+1}^{sN} r_1^* \tag{3}$$

$$\exp(j\theta_1)*\exp(j2\pi[f_1+\Delta f][T_s+\Delta T_s]n)*\exp(-j2\pi f_k T_s n).$$

Setting $f_k=f_1$ in equation 3 above and summing the geometric series on the right hand side (RHS) leads to:

$$X_S[k]=r_1*\exp(j\theta_1)*\exp(j2\pi\theta*[(S-1)*N+1])*\{1-\exp(j2\pi\theta*N)\}/\{1-\exp(j2\pi\theta)\}, \tag{4}$$

where $\theta=\Delta f*T_s+f_k*\Delta T_s+\Delta f*\Delta T_s$. Retaining the S dependent part of the phase then leads to:

$$\Theta_k(S)=2\pi*[\Delta f*T_s+f_k*\Delta T_s+\Delta f*\Delta T_s]*S*N, \tag{5}$$

where $f_k$ is the frequency of the $k^{th}$ probing tone. It should be noted that taking the limit as $\theta \to 0$, reduces the RHS of Equation 4 to $N*r_1*\exp(j\theta_1)$, as expected. Note that the limits of $$\frac{1-e^{j2\pi\theta N}}{1-e^{j2\pi\theta}}$$

as $\theta \to 0$ is N. In Equation 5, the first, second and third terms represent the contributions of the frequency offset, clock slew and the frequency offset-clock slew combination, respectively. The difference, $\phi_k(Q)$, between $\Theta_k$ evaluated for windows S and S+Q is then:

$$\phi_k(Q)=2\pi*[\Delta f*T_s+f_k*\Delta T_s+\Delta f*\Delta T_s]*Q*N \tag{6}$$

Equation 6 thus models the $\phi_k(Q)$ versus $f_k$ curve obtained from DFT values of the V.34 probing waveform. The equation represents a straight line and the clock slew, $\Delta T_s$, is estimated by computing the slope of this line. It is worth noting that in the subsequent discussion, the scalars $\phi_k(Q)$ (k=1 ... K), where K is the size of the subset of V.34 probing tone set used, are together denoted by the vector $\phi$.

In order to improve the accuracy of the estimated clock slew in the presence of random noise in accordance with the invention, an interleaved averaging process over many temporal windows is implemented by dividing the received temporal windows into R sets. The R sets preferably have M windows in each set. Also, the M windows in each set are Q windows apart. Each set yields (M−1) vectors $\phi$, whose components are the values $\phi_k(Q)$ (k=1 ... K), where K is the size of the subset of V.34 probing tone set used. The M−1 vectors of each set are then averaged to form R averaged vectors. These R averaged vectors are further averaged to form one final averaged vector $<\phi>$.

The line frequency response (non-constant loss over the V.34 probing tone set) can lead to significantly less SNRs at specific frequencies such as, $f_k$, thus degrading the clock slew estimate when such frequencies are included in the subset used to compute $<\phi>$. In order to optimize the accuracy of the estimate over different lines which change with each new telephone line connection that is established, several frequency pairs (e.g., $f_i,f_j$) from the V.34 probing frequency set are preferably considered in accordance with the invention. An averaged SNR value offered by each pair is computed from measurements of the noise power spectral density values at those frequencies.

In general, frequencies with larger separation will yield larger values of $2\pi*(f_j-f_i)*\Delta T_s*Q*N$ which forms the actual "signal" for clock slew estimation which is a portion of the transform of the line probing signal. Thus, the above line shape dependent SNR is converted into an "effective" SNR offered by each frequency pair by weighing it with an experimentally determined, and separation dependent factor. Finally, the frequency pair with the maximum effective SNR is chosen, e.g., components of $<\phi>$ corresponding to this pair are used to estimate the clock slew (i.e., $\Delta T_s$). The details of calculating the clock slew from $<\phi>$ are described below.

The K components of $<\phi>$ are represented by Equation 6, for k=1,2, ... K. The two components of $<\phi>$ that yield the maximum effective SNR are then chosen. For example, assuming that the components which yield the maximum effective SNR are found to be the ith and the jth components which correspond to the frequencies $f_i$ and $f_j$. These ith and jth components are obtained from Equation 6 as:

$$\phi_j(Q)=2\pi*[\Delta f*T_s+f_j*\Delta T_s+\Delta f*\Delta T_s]*Q*N \tag{7}$$

and, $$\phi_i(Q)=2\pi*[\Delta f*T_s+f_i*\Delta T_s+\Delta f*\Delta T_s]*Q*N, \tag{8}$$

respectively.

Subtracting Equation 7 from Equation 8, thus retaining the slope of the line, yields, $$\phi_j(Q)-\phi_i(Q)=2\pi*(f_j-f_i)*\Delta T_s*Q*N. \tag{9}$$

From Equation 9, the clock slew readily follows as:

$$\Delta T_s=(\phi_j(Q)-\phi_i(Q))/(2\pi*(f_j-f_i)*Q*N) \tag{10}$$

The process of interleaved averaging to combat noise and choosing frequencies that offer a high effective SNR to optimize over line shapes, as described above in relation to clock slew, is also applied in the estimation of the frequency offset ($\Delta f$).

Under the constraint of a fixed maximum duration of the V.34 probing sequence, the choice of the parameters "P", "R", "M" and "Q" is based upon the trade-off between the number of averages performed and the maximization of the quantity $\phi_k(Q)$. The following choice of parameters were experimentally determined to yield an accuracy better than 5 parts-per-million (ppm) in the clock slew estimate in the presence of additive white noise at a SNR of 35 db: P=2 (this makes N=128 at a sampling frequency of 9600 Hz), Q=16 and R=16. Successive windows were used as the first elements of the R sets of windows, with M=2 windows in each set. In the absence of additive noise (SNR better than 60 db) the maximum error observed was 1 ppm. Also, accuracy's of the order of 20 ppm were obtained for a SNR of 25 db.

In order to better understand the present invention an example is provided immediately below.

EXAMPLE

Figure 4:
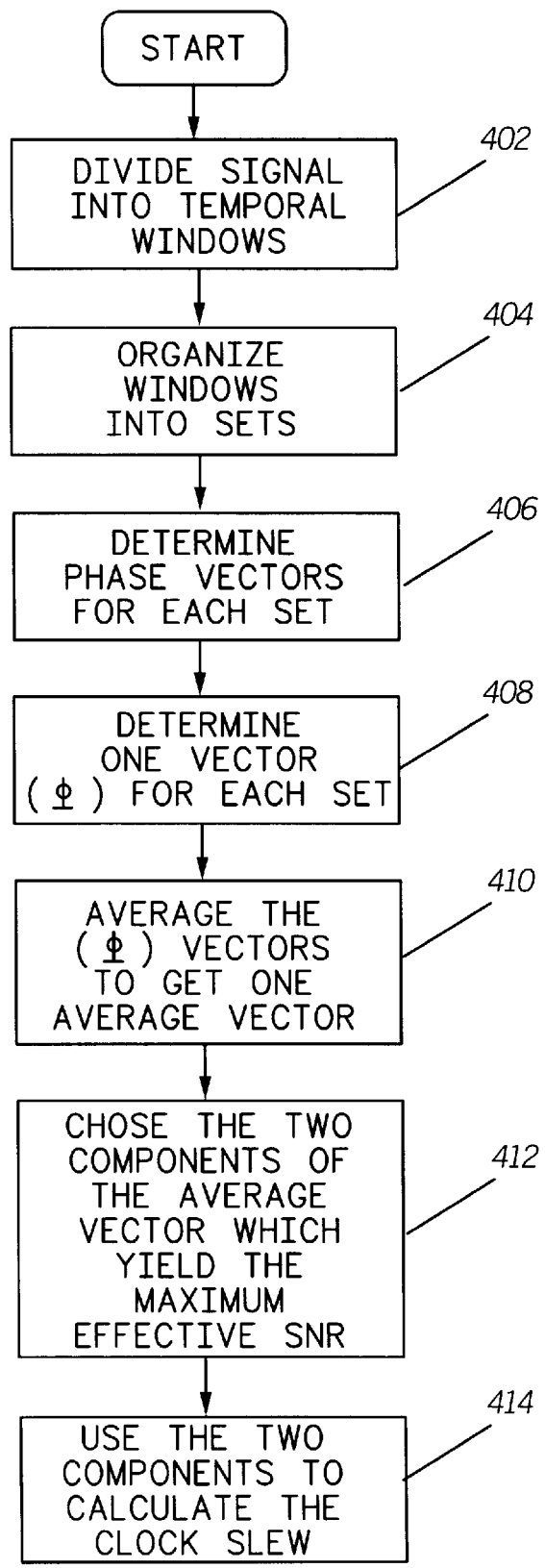
FIG. 4 shows a flow chart of the steps taken in order to calculate clock slew in accordance with the invention.

In this example, the variables are set at R=16, Q=16 and M=2. The first step is to take the V.34 probing signal, which is periodic with period $1/f_0$, and divide it into temporal windows or time frames, each of duration P=2 as illustrated in FIG. 2. This step is also shown as step 402 in the flowchart of FIG. 4. Next, in step 404, and as illustrated in FIG. 3, the temporal windows indexed by "S" are organized into R=16 sets of M=2 windows per set. The two windows in each set are then separated from each other by Q=16 windows. In step 406, the phase vectors for each set are determined. In this particular example, each set yields M=2 phase vectors $\Theta$, the components of which, $\Theta_k$, (k=1 ... K) are the DFT phases at a subset of the V.34 probing frequencies. In this example, where R=16, the first set includes windows 1 and 17, which gives 2 phase vectors $\Theta$, one from each window as illustrated in FIG. 3. The second set, comprises windows 2 and 18, again giving 2 phase vectors $\Theta$. This process is repeated for all 16 sets.

After the windows have been separated, in step 408, the differences between the two phase vectors $\Theta$ from each set yields 1(=M−1) vector $\phi$, in this particular example. In step 408, for each set, $$\phi = \Theta \text{ of 2nd window} - \Theta \text{ of 1st window}$$

In this example there are 16 vectors $\phi$. The components of each vector are $\phi_k$ (k=1 ... K), $$\phi = [\phi_1 \phi_2 \ldots \phi_k].$$

The sixteen vectors $\phi$, are then averaged, $$<\phi> = [<\phi_1><\phi_2> \ldots <\phi_k>]$$

in step 410, in order to form one averaged vector $<\phi>$. The clock slew and frequency estimates are then derived from the components of $<\phi>$, as described in the discussion of equations 7–10 above. In step 412, the two components of the average vector which yield the maximum effective SNR are chosen. Preferably the maximum effective SNRs are determined from measurements of the noise power spectral density values at the particular frequencies. In step 414, the two components chosen are then used to calculate the clock slew using equation 10 above.

It is worth noting that if the variable M is set to a number greater than 2, the number of phase vectors from each set will equal (M−1) vectors $\phi$. For example, if M=3, then there will be two vectors $\phi$ per set which are determined by taking the difference between adjacent phase vectors $\Theta$ from each set.

Estimating frequency offset using the clock slew estimate

In the absence of an estimate for clock slew, an estimate of the frequency offset is derived by discarding the effect of clock slew on it. This is equivalent to neglecting the contribution of the clock slew (i.e., the second order term 2 $\pi\Delta f^* \Delta T_s Q^* N$ in Equation (6) to the intercept of the straight line represented by Equation 6. However, when $\Delta T_s$ is estimated as discussed above, it is not necessary to neglect this term, and the estimate of $\Delta f$ can be improved in accordance with the invention by accounting for the contribution of $\Delta T_s$ to the intercept as follows:

$$\Delta f = (\phi_k(Q)/(2\pi^* Q^* N) - f_k^* \Delta T_s)/(T_s + \Delta T_s). \tag{11}$$

Expressing clock slew in parts per million:

The clock slew, $\Delta T_s$, can be expressed as a deviation $n_{ppm}$ in parts per million (ppm) over the nominal value of $T_s$ as:

$$n_{ppm} = 10^{6*}[<\phi_k> - <\phi_j>]/[2\pi(f_k - f_j)^* T_s^* Q^* N], \tag{12}$$

where $<\phi_k>$ and $<\phi_j>$ are the components of the vector $<\phi>$ at frequencies $f_k$ and $f_j$, respectively. In Equation 12, the angle per ppm, i.e., $x = 2\pi(f_k - f_j)^* T_s^* Q^* N^* 10^{-6}$, is for practical numbers, of the order of the quantization error encountered in 16 bit machines. Thus a quantization error $\Delta x$ in x leads to an error $\Delta n_{ppm}$ in $n_{ppm}$. These quantities are related as shown below:

$$(n_{ppm} + \Delta n_{ppm}) = (<\phi_k> - <\phi_j>)/(x + \Delta x). \tag{13}$$

A first order estimate of $\Delta n_{ppm}$ can be obtained by doing a Taylor series expansion of the RHS and retaining terms up to the first order yielding:

$$\Delta n_{ppm} \approx -n_{ppm} \Delta x/x \approx -(n_{ppm} + \Delta n_{ppm})\Delta x/x \tag{14}$$

This estimate is subtracted from $n_{ppm} + \Delta n_{ppm}$ to obtain an improved value of $n_{ppm}$. It is worth noting that replacing $n_{ppm}$ by the available quantity $n_{ppm} + \Delta n_{ppm}$ is a higher order correction and leads to an error in $\Delta n_{ppm}$ of the order of $\Delta n_{ppm} \Delta x/x$.

Figure 5:
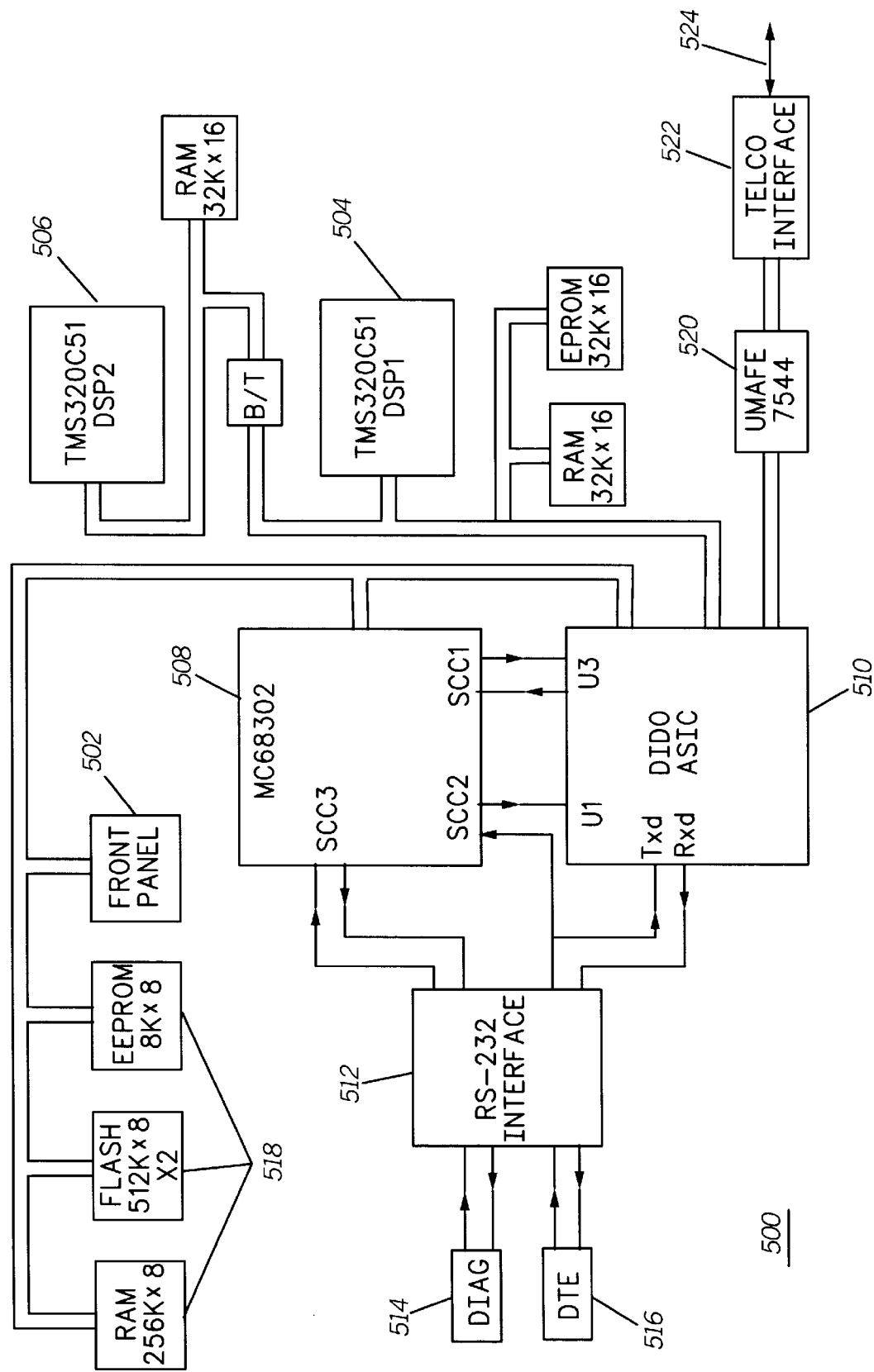
FIG. 5 shows a block diagram of a modem in accordance with the invention.

Referring to FIG. 5, a block diagram of a communication device such as a modem 500 which can perform the clock slew estimation and frequency offset estimation in accordance with the present invention is shown. Modem 500 comprises a controller 508 such as a 68302 microcontroller manufactured by Motorola, Inc. The controller 508 is coupled to external memory 518 which takes the form of conventional RAM, EEPROM, etc. The controller 508 executes appropriate control software and is responsible for the overall operation of modem 500.

In the preferred embodiment, the modem's data pump is implemented using two TMS320C51 digital signal processors 504 and 506 manufactured by Texas Instruments, Inc. A conventional RS-232 interface circuit 512 provides interface between a diagnostic port 514 and a data terminal equipment (DTE) port 516 and the modem electronics. A digital-in/digital-out (DIDO) ASCIC device 510 provides digital interface between the digital signal processors (DSPs) 504 and 506, the RS-232 interface 512, and controller 508.

An input port 524 which takes the form of a telephone line connector connects the modem 500 with the PSTN. Coupled to the input port 524 is a conventional telephone interface circuit 522 which provides the appropriate line interfacing between the PSTN and modem electronics. A universal mode analog front-end (UMAFE) circuit 520 which can take the form of a ST7544 integrated circuit manufactured by SGS-Thompson, Inc. provides filtering, digital-to-analog and analog-to-digital conversions, transmit and receive clocks, and proper line interface between the telephone line interface 522 and the DIDO digital circuit 510. Finally, a front panel 502 provides for user interface with modem 500.

The clock slew and frequency offset estimations algorithms of the present invention are executed by the signal processors 504 and 506 which are under the control of controller 508. The incoming line probing signal is received at port 524 and are filtered and converted from analog to digital by UMAFE 520. The signal is then sent through DIDO 510 prior to being acted on by the DSPs 504 and 506.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A method for estimating the clock slew between first and second data communication devices, the method comprising the steps of:

at the second data communication device:
   (a) receiving a signal from the first data communication device;
   (b) dividing the signal into temporal windows;
   (c) organizing the temporal windows into a predetermined number of sets with each set including at least two of the temporal windows;
   (d) calculating a phase vector for each of the at least two temporal windows in each set;
   (e) determining the difference between the at least two phase vectors in each set in order to yield at least one vector ($\phi$) for each set;
   (f) averaging the at least one vector ($\phi$) determined in step (e) for each set in order to yield one averaged vector $<\phi>$;
   (g) selecting two components ($\phi_1(Q)$, $\phi_2(Q)$) of the averaged vector $<\phi>$ which yield the maximum effective signal-to-noise ratio; and
   (h) using the two components determined in step (g) to determine the clock slew between the first and second data communication devices.

2. A method as defined in claim 1, wherein step (h) comprises the steps of:
   (h1) subtracting the two components $\phi_2(Q)$ and $\phi_1(Q)$ from each other; and
   (h2) determining the value for the clock slew by dividing the resultant in step (h1) by $2\pi^*(f_2-f_1)^*Q^*N$, wherein "$f_1$ and $f_2$" are the frequencies for the two components ($\phi_1(Q)$, $\phi_2(Q)$) respectively, "Q" is the number of temporal windows separating the at least two temporal windows chosen, and "N" is the number of samples in each temporal window.

3. A method as defined in claim 1, wherein the first and second communication devices are modems and the signal received by the second communication device is a line probing signal transmitted by the first communication device.

4. A method as defined in claim 1, wherein the signal received in step (a) is received over a predetermined period of time.

5. A method as defined in claim 1, wherein the maximum effective signal-to-noise ratio in step (g) is determined by taking the measurements of the noise power spectral density values for each of the components which form the averaged vector $<\phi>$.

6. A method as defined in claim 4, wherein the temporal windows in step (b) are of equal time duration.

7. A method for estimating clock slew and frequency offset at a first modem from the line probing signal transmitted by a second modem, the method comprising the steps of:
   (a) receiving the line probing signal at the first modem;
   (b) dividing the line probing signal into at least two time periods;
   (c) calculating a phase vector for each of the at least two time periods;
   (d) determining the difference between the phase vectors in order to yield one vector ($\phi$);
   (e) selecting two components ($\phi_1(Q)$, $\phi_2(Q)$) of the vector ($\phi$) which yield the maximum effective signal-to-noise ratio; and
   (f) using the two components determined in step (e) to estimate the clock slew, $\Delta T_s$, between the first and second modems.

8. A method as defined in claim 7, wherein step (f) comprises the steps of:
   (f1) subtracting the two components $\phi_2(Q)$ and $\phi_1(Q)$ from each other; and
   (f2) determining the value for the clock slew by dividing the resultant in step (f1) by $2\pi^*(f_2-f_1)^*Q^*N$, wherein "$f_1$ and $f_2$" are the frequencies for the two components ($\phi_1(Q)$, $\phi_2(Q)$) respectively, "Q" is the number of time periods separating the at least two time periods chosen, and "N" is the number of samples in each time period.

9. A method as defined in claim 8, comprising the further steps of:
   (g) estimating the frequency offset, $\Delta f$, between the first and second modem by using the clock slew, $\Delta T_s$, determined in step (f) in the following equation:

$$\Delta f = (\phi_k(Q)/(2\pi^*Q^*N) - f_k^*\Delta T_s)/(T_s + \Delta T_s),$$

wherein:
"N" is the number of samples in each time period,
"$\Delta T_s$" is the estimated clock slew,
"($f_k, \phi_k(Q)$)" is either ($f_1, \phi_1(Q)$) or ($f_2, \phi_2(Q)$), and
"Q" is the number of time periods separating the at least two time periods chosen.

10. A communication device which receives a signal from a remote device, the communication device comprising:
an input port for receiving the signal; and
a signal processor coupled to the input port and in response to the received signal estimates the clock slew between the communication device and the remote device by dividing the signal into at least two time periods, then calculates phase vectors for the at least two time periods, determines the difference between the phase vectors in order to yield one vector ($\phi$), then selects two components ($\phi_1(Q)$, $\phi_2(Q)$) of the vector ($\phi$) which yield the maximum effective signal-to-noise ratio, and uses the two selected components to estimate the clock slew between the communication device and the remote device.

11. A modem as defined in claim 10, wherein both the communication device and the remote device comprise modems.

12. A modem as defined in claim 10, wherein the signal processor comprises a digital signal processor.

* * * * *